United States Patent
Deng

(10) Patent No.: US 12,326,252 B1
(45) Date of Patent: Jun. 10, 2025

(54) CAMPING FAN TELESCOPIC LAMP

(71) Applicant: Kaixian Deng, Chenzhou (CN)

(72) Inventor: Kaixian Deng, Chenzhou (CN)

(*) Notice: Subject to any disclaimer, the term of this patent is extended or adjusted under 35 U.S.C. 154(b) by 0 days.

(21) Appl. No.: 19/086,484

(22) Filed: Mar. 21, 2025

(51) Int. Cl.
| | |
|---|---|
| F21V 33/00 | (2006.01) |
| F04D 19/00 | (2006.01) |
| F04D 25/06 | (2006.01) |
| F04D 25/08 | (2006.01) |
| F04D 29/52 | (2006.01) |
| F04D 29/60 | (2006.01) |
| F04D 29/64 | (2006.01) |
| F16M 11/28 | (2006.01) |
| F21V 21/06 | (2006.01) |
| F21V 21/14 | (2006.01) |
| F21V 21/22 | (2006.01) |
| F21V 29/67 | (2015.01) |

(52) U.S. Cl.
CPC ........ *F21V 33/0096* (2013.01); *F04D 19/002* (2013.01); *F04D 25/0673* (2013.01); *F04D 25/08* (2013.01); *F04D 25/084* (2013.01); *F04D 29/522* (2013.01); *F04D 29/601* (2013.01); *F04D 29/646* (2013.01); *F16M 11/28* (2013.01); *F21V 21/06* (2013.01); *F21V 21/145* (2013.01); *F21V 21/22* (2013.01); *F21V 29/67* (2015.01)

(58) Field of Classification Search
CPC .... F21V 33/0096; F21V 21/06; F21V 21/145; F21V 21/22; F21V 29/67; F04D 19/002; F04D 25/0673; F04D 25/08; F04D 25/084; F04D 29/522; F04D 29/601; F04D 29/646; F16M 11/28
See application file for complete search history.

(56) References Cited

U.S. PATENT DOCUMENTS

| | | | | |
|---|---|---|---|---|
| 2,909,316 A * | 10/1959 | Prohaczka | .......... | F21V 33/0088 416/246 |
| 5,603,562 A * | 2/1997 | Huang | .................... | F21S 6/007 362/183 |
| 5,791,763 A * | 8/1998 | Kam-Hoi | .................. | F21L 4/08 362/198 |
| 7,431,467 B2 * | 10/2008 | Nath | ........................ | F21L 4/00 362/293 |
| 8,027,573 B2 * | 9/2011 | Byrne | .................... | F24H 3/022 392/382 |
| 10,760,748 B2 * | 9/2020 | Liu | ........................ | F21S 6/002 |
| 11,242,859 B2 * | 2/2022 | Yi | .............................. | F04F 5/46 |
| 12,270,406 B1 * | 4/2025 | Deng | .................. | F21V 33/0096 |

* cited by examiner

Primary Examiner — Peter J Bertheaud
(74) Attorney, Agent, or Firm — JEEN IP LAW, LLC

(57) ABSTRACT

A multifunctional camping fan telescopic lamp is provided, which includes a base, a rotating base, a fan, and a telescopic lamp. The rotating base is in a "Y" shape and is installed on the base through a rotating mechanism to achieve a horizontal circular rotation of the fan; a cover is provided with a built-in light strip, thereby providing additional lighting or ambient lighting effects. Two sides of the fan are connected to the rotating base through a ratchet module, enabling manual adjustment of up-and-down tilt angle. The telescopic lamp is installed on a back of the fan through a telescopic rod, allowing for free adjustment of the light height and rotation within multiple angle ranges to expand an illumination range. Internally integrated with batteries, PCB boards, and intelligent control systems, it supports functions such as power display and working mode selection, thereby optimizing energy utilization efficiency.

10 Claims, 9 Drawing Sheets

CAMPING FAN TELESCOPIC LAMP

TECHNICAL FIELD

The present disclosure relates to the field of portable outdoor fans and lighting fixtures technologies, and in particular, to a camping fan telescopic lamp.

BACKGROUND

In outdoor activities and emergency situations, traditional camping fans and lighting equipment are often designed as standalone products, which not only increases the burden of carrying, but also limits the flexibility of use. For example, when campers need to use fans to maintain air circulation and use lighting fixtures to provide nighttime illumination, they have to carry fans and lighting fixtures separately, which not only takes up more space but may also cause inconvenience due to power issues. Furthermore, traditional fans and lighting fixtures often lack angle adjustment functions, rendering it difficult to meet the needs of users to adjust wind direction or lighting direction according to different scenes.

Although the existing integrated fan lights have solved the above problems to some extent, most of them have problems such as complex structure, inconvenient operation, and insufficient durability. Especially for devices that hope to operate stably in outdoor environments for a long time, the performance of existing products is often unsatisfactory. There are many limitations on camping fans and lighting equipment in the current market, and there is an urgent need for a new generation product that integrates multiple functions and has good user experience. Therefore, a camping fan telescopic lamp is proposed to solve the above problems.

SUMMARY

The present disclosure provides a multifunctional camping fan telescopic lamp, which aims to integrate fan and lighting functions, and has flexible angle adjustment and suspension capabilities to adapt to different usage scenarios. This device not only meets ventilation needs of outdoor activities, but also provides reliable lighting support, with a compact and portable design.

The present disclosure provides a camping fan telescopic lamp, including a base, a rotating base, a fan, and a telescopic lamp; where the rotating base is Y-shaped and rotatably provided on the base so as to achieve a circular rotation of the fan in a horizontal plane; two sides of the fan are rotatably provided on the rotating base so as to adjust up-and-down tilt angle of the fan; the telescopic lamp is provided on a back of the fan through a telescopic rod, thereby allowing a height of the light to be freely adjusted and enhancing the flexibility of use; the base is provided with a battery and a PCB board, and a surface of the base is provided with a control button; the PCB board is electrically connected to the battery, the control button, the telescopic lamp, and a motor of the fan.

In some embodiments of the present disclosure, a foldable hook is provided at a bottom of the base, and the hook is connected to the base through a ratchet module so as to achieve an inverted suspension of the fan.

In some embodiments of the present disclosure, a fixed disk is provided at a center of a top of the base, and a swing motor is provided at a center of a bottom of the rotating base, an output shaft of the swing motor is clamped on the fixed disk, and the swing motor is electrically connected to the PCB board so that an electric rotation of the fan on a horizontal plane can be achieved.

In some embodiments of the present disclosure, a mounting arm of the rotating base is connected to two sides of the fan through the ratchet module to realize a manual adjustment of an angle of the fan.

In some embodiments of the present disclosure, the ratchet module includes a ratchet plate, a spring plate, and a rotating plate, the spring plate is fixed on the rotating plate and meshes with teeth of the ratchet plate; the ratchet plate and the rotating plate are respectively fixed on rotating components, and the ratchet plate is a bidirectional indexing ratchet. The ratchet disc has multiple evenly distributed teeth, which are used to achieve indexing and positioning during rotation. The spring plate contacts and disengages from the teeth of the ratchet plate through elastic deformation, thereby providing rotational resistance and ensuring position locking after each rotation.

In some embodiments of the present disclosure, the fan includes a cover, the motor, and fan blades, the cover wraps the motor and the fan blades, and the motor drives the fan blades to rotate.

In some embodiments of the present disclosure, a circular recess is provided at a front of the cover, and a lamp strip is provided in the recess; a lampshade wraps and fixes the lamp strip in the recess, and the lamp strip is electrically connected to the PCB board so as to achieve lighting or ambient lighting functions.

In some embodiments of the present disclosure, the telescopic lamp includes the telescopic rod, a T-shaped head, an LED light board, a cover plate, and the lampshade; the T-shaped head is provided at an upper of the telescopic rod, the cover plate is rotatably connected to the T-shaped head, and the LED light board is fixed on the cover plate and wrapped by the lampshade, ensuring that the LED light board can rotate freely in multiple angles and expanding the illumination range.

In some embodiments of the present disclosure, a surface of the base is provided with an indicator light electrically connected to the PCB board, which can directly display a current working state, such as battery level, working mode, etc.; and reinforced decorative covers are provided on two sides of the base, which not only enhances the appearance beauty of the product, but also strengthens the structural strength.

In some embodiments of the present disclosure, a power management module, a driving circuit, and a control circuit are integrated on the PCB board, and the power management module is configured for charging, voltage regulation, and providing overcharge and over-discharge protection for the battery; the driving circuit is configured to control operations of the motor and light beads; the control circuit includes a microcontroller to process various input signals and perform corresponding actions.

Compared with the existing technology, the present disclosure has the following beneficial effects.

1. Combining the fan and telescopic lamp into one reduces the burden on a user and improves space utilization. Whether it's daytime ventilation or nighttime lighting, one device can meet all needs, greatly simplifying the selection and management of outdoor equipment.

2. The rotating base is a "Y"-shaped design and is installed on the base through a rotating mechanism, allowing the fan to automatically rotate in a circular motion on a horizontal plane. The two sides of the fan are connected to the rotating base through rotating joints, thereby achieving manual adjustment of the up-and-down tilt angle, ensuring that user can flexibly adjust the wind direction and lighting direction according to his needs.

The telescopic lamp is fixed to the back of the fan through a telescopic rod, allowing the height and angle of the light to be freely adjusted, further enhancing the flexibility of use.

3. The bottom of the base is provided with a foldable hook, which is connected to the base using a ratchet module. It not only supports an inverted suspension mode, but also ensures stability in the suspended state. Even under the vibration generated by the fan during operation, it can remain stable and not fall off, suitable for various hanging points such as tree trunks and tents.

4. The front of the protective cover is specially designed with a circular recess, which contains a built-in light strip as an additional lighting source or ambient lighting. The lampshade fixes the light strip in the recess, which not only increases the lighting function but also enhances the appearance beauty of the product. Reinforced decorative covers are installed on two sides of the base, which not only enhances the aesthetic appearance of the product but also strengthens its structural strength.

In summary, the c camping fan telescopic lamp provided by the present disclosure not only overcomes the limitations of existing products through a series of innovative designs and technological integrations but also brings new user experience. It is a portable outdoor device that integrates fan and lighting functions, with high flexibility and stability, rendering it very suitable for the needs of modern outdoor enthusiasts.

BRIEF DESCRIPTION OF DRAWINGS

In order to provide a clearer explanation of the technical solution in the embodiments of the present disclosure, a brief introduction will be given to the drawings required for the description of the embodiments. It is obvious that the drawings described below are only some embodiments of the present disclosure. For those skilled in the art, other drawings can be obtained based on these drawings without creative work.

NUMERAL REFERENCE

1—base; 11—decorative cover; 12—battery; 13—ratchet module; 131—ratchet plate; 132—spring plate; 133—rotating plate; 14—hook; 15—fixed disk; 16—PCB board; 161—control button; 162—indicator light; 2—rotating base; 21—swing motor; 3—fan; 31—cover; 32—motor; 33—fan blade; 34—lamp strip; 35—lampshade; 4—telescopic lamp; 41—telescopic rod; 42—T-shaped head; 43—LED light board; 44—cover plate; 45—fixed component.

Through the above drawings, clear embodiments of the present disclosure have been shown, which will be described in more detail in the following description. These drawings and descriptions are not intended to limit the scope of the inventive concept in any way, but rather to illustrate the concept of the invention for those skilled in the art by referring to specific embodiments.

DESCRIPTION OF EMBODIMENTS

Below, the technical solutions in the embodiments of the present disclosure will be clearly and completely described in combination with the accompanying drawings. Obviously, the described embodiments are a part of the embodiments of the present disclosure, not all of them. Based on the embodiments of the present disclosure, all other embodiments obtained by those skilled in the art without creative work are within the protection scope of the present disclosure.

In order to clarify the technical solution and advantages of the present disclosure, further detailed descriptions of the embodiments of the present disclosure will be provided below in combination with the accompanying drawings.

Figure 4:
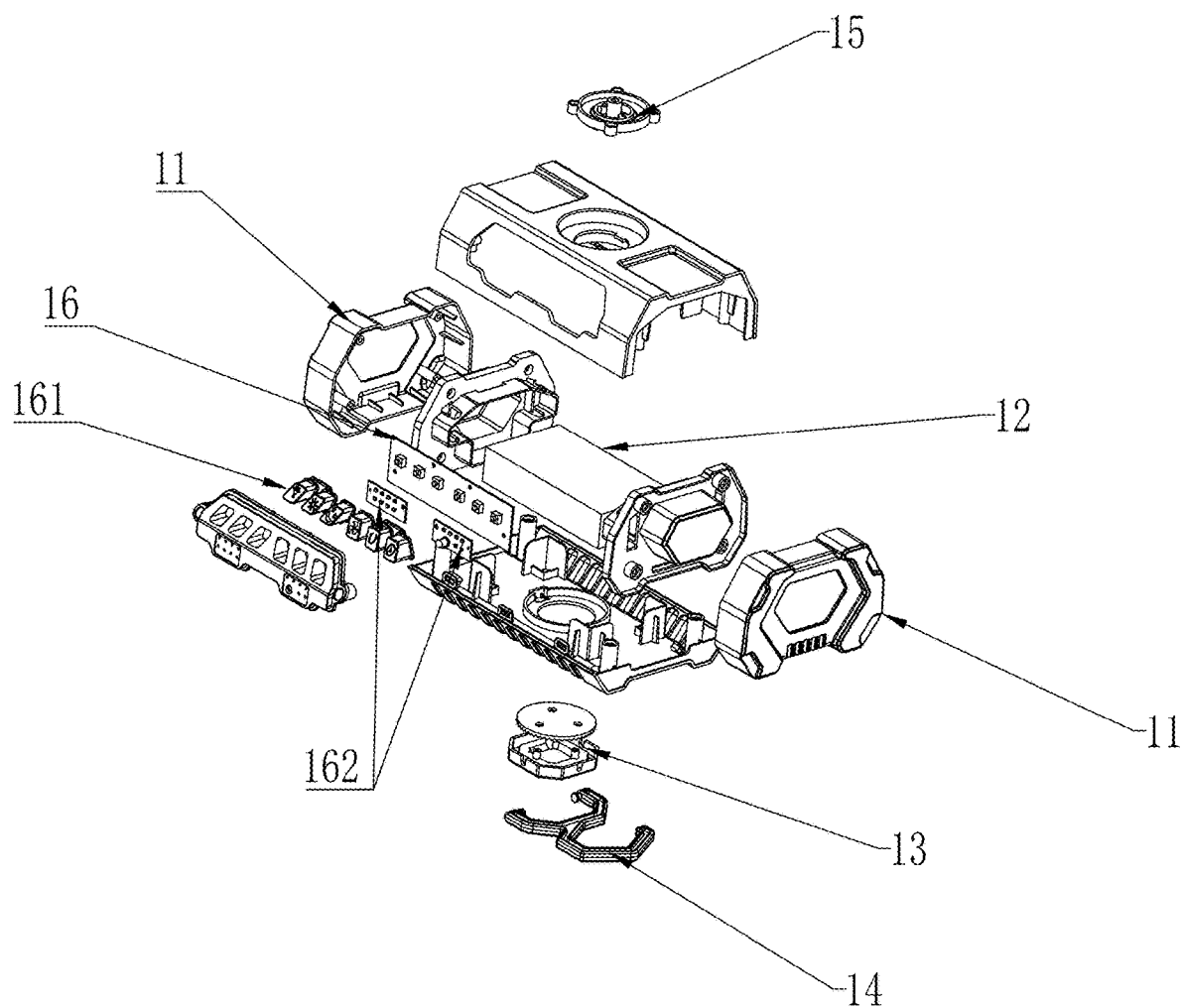
FIG. 4 is an explosion schematic diagram of a base provided by an embodiment of the present disclosure.
Figure 5:
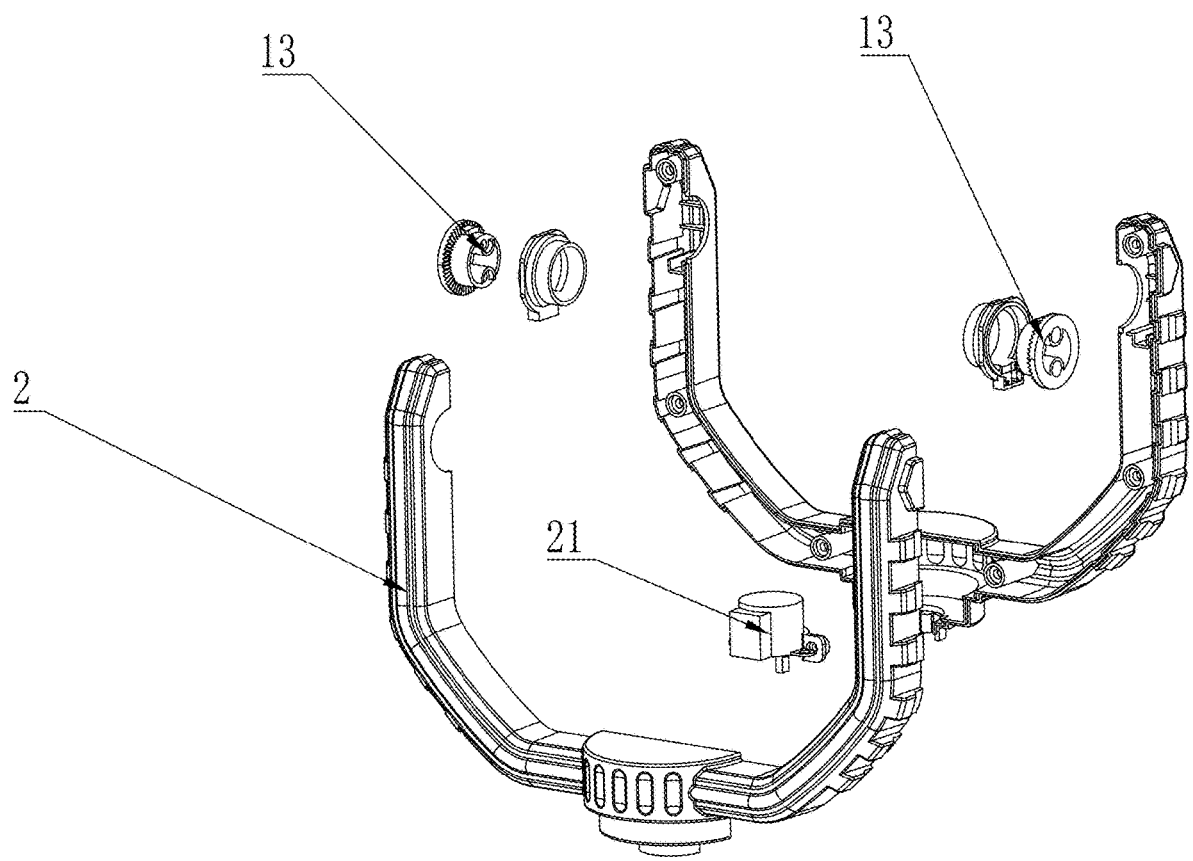
FIG. 5 is a schematic diagram of a rotating base provided by an embodiment of the present disclosure.
Figure 6:
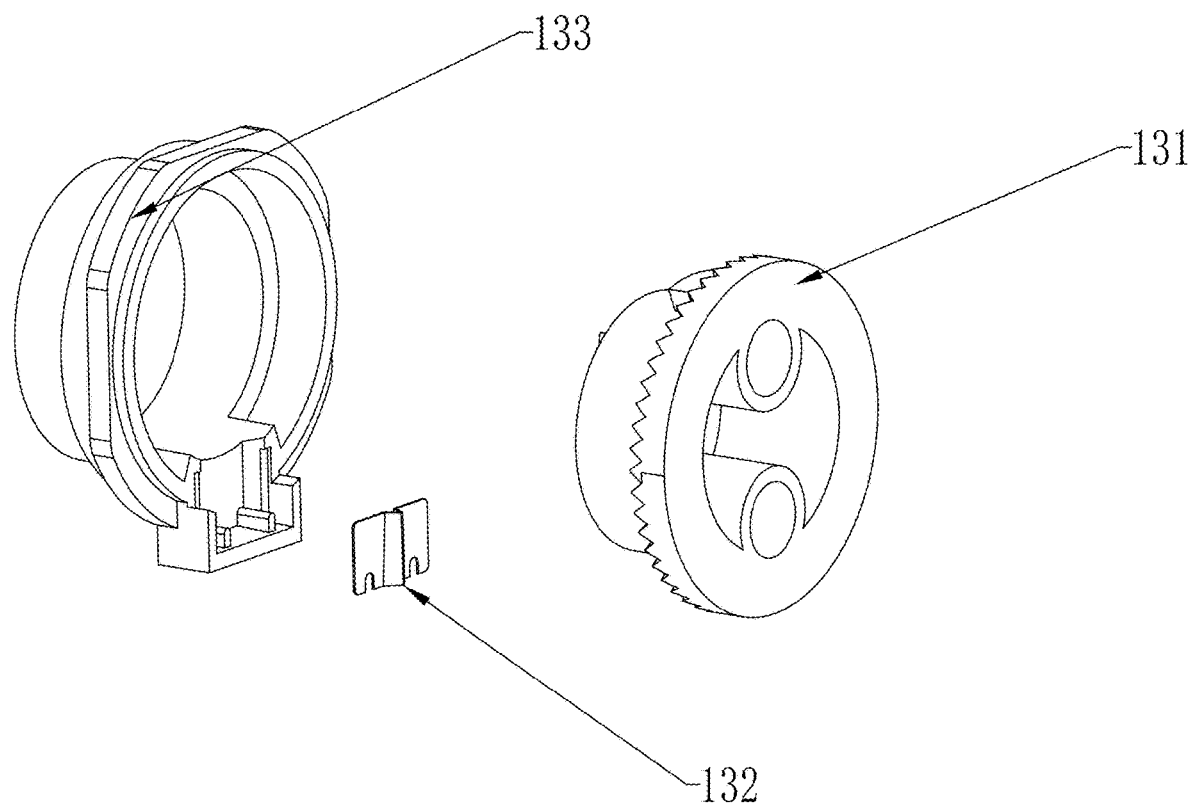
FIG. 6 is a schematic structural diagram of a ratchet module provided by an embodiment of the present disclosure.
Figure 7:
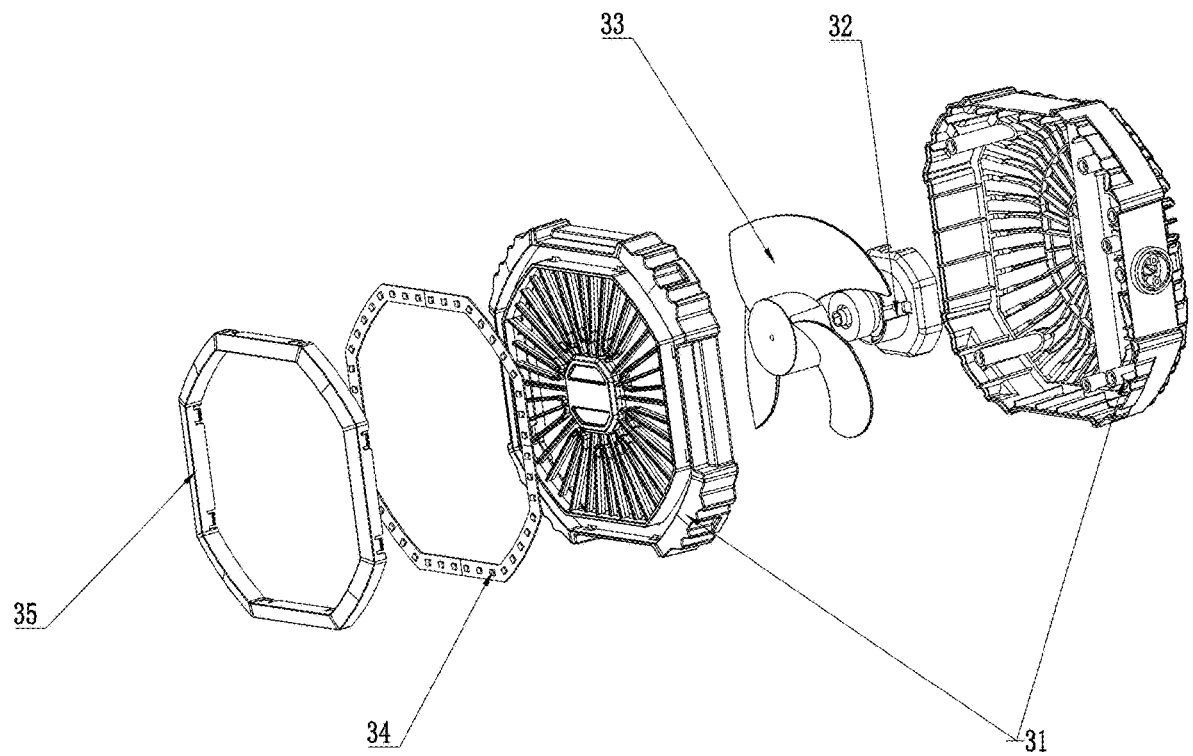
FIG. 7 is an explosion schematic diagram of a fan provided by an embodiment of the present disclosure.

Please refer to FIGS. 1-9. The present disclosure provides a camping fan telescopic lamp, including a base 1, a rotating base 2, a fan 3, and a telescopic lamp 4. The rotating base 2 is designed in a "Y" shape and can be rotatably installed on the base 1. A top center of the base 1 is provided with a fixed disk 15, and a bottom center of the rotating base 2 is provided with a swing motor 21, as shown in FIGS. 4 and 5. An output shaft of the swing motor 21 is clamped on the fixed disk 15, and the swing motor 21 is electrically connected to a PCB board 16 to achieve an electric circular rotation of the fan 3 in a horizontal plane. As shown in FIG. 7, the fan 3 includes a cover 31, a motor 32, and fan blades 33. The cover 31 wraps around the motor 32 and the fan blades 33, and the motor 32 drives the fan blades 33 to rotate. A front of the cover 31 is provided with a circular recess, and a lamp strip 34 is provided in the recess. A lampshade 35 wraps and fixes the lamp strip 34 in the recess, and the lamp strip 34 is electrically connected to the PCB board 16 to achieve lighting or ambient lighting functions.

As shown in FIGS. 5 and 6, in order to manually adjust up-and-down tilt angle of the fan 3, a mounting arm of the rotating base 2 is connected to two sides of the fan 3 through a ratchet module 13, thereby achieving an adjustment of the up-and-down tilt angle of the fan 3. The ratchet module 13 includes a ratchet plate 131, a spring plate 132, and a rotating plate 133. The spring plate 132 is fixed on the rotating plate 133 and meshes with teeth of the ratchet plate 131. The ratchet plate 131 and the rotating plate 133 are respectively fixed on rotating components, and the ratchet plate 131 is a bidirectional indexing ratchet. The ratchet plate 131 has multiple uniformly distributed teeth for achieving indexing and positioning during rotation. The spring plate 132 contacts and disengages from the teeth of the ratchet plate 131 through elastic deformation, thereby providing rotational resistance and ensuring position locking after each rotation. This design allows a user to easily adjust the angle of the fan 3, and each rotation produces a clear sense of division, thereby ensuring position locking and improving convenience and stability of use.

Figure 9:
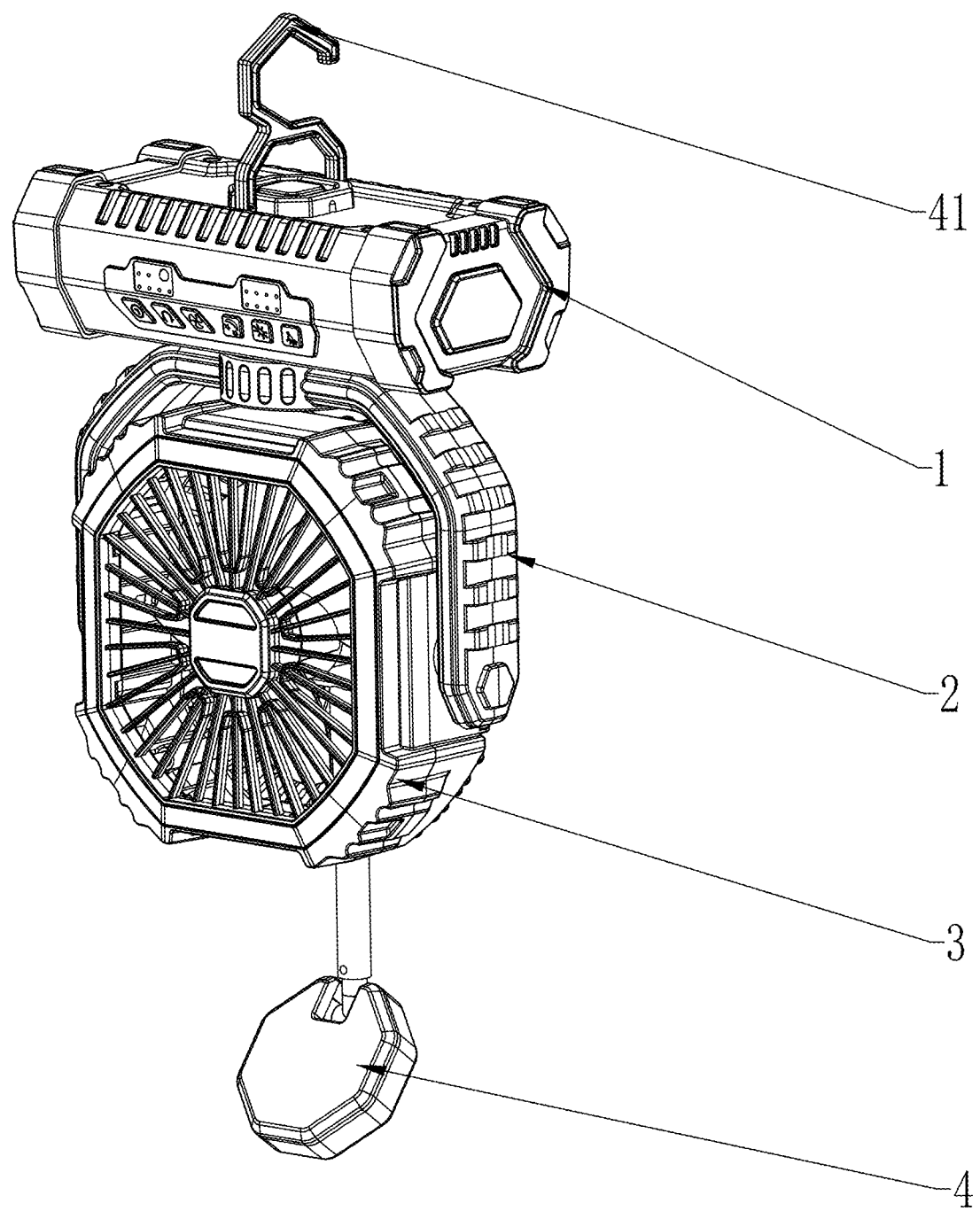
FIG. 9 is a use schematic diagram of a camping fan telescopic lamp provided by an embodiment of the present disclosure.

A foldable hook 14 is provided at a bottom of the base 1, as shown in FIG. 9. The hook 14 is connected to the base through the ratchet module 13, which not only supports an inverted suspension mode but also ensures stability in the suspended state. Even under the vibration generated by the operation of the fan 3, it can remain stable and not fall off, suitable for various hanging points such as tree trunks and tents, thereby greatly facilitating user use.

Figure 1:
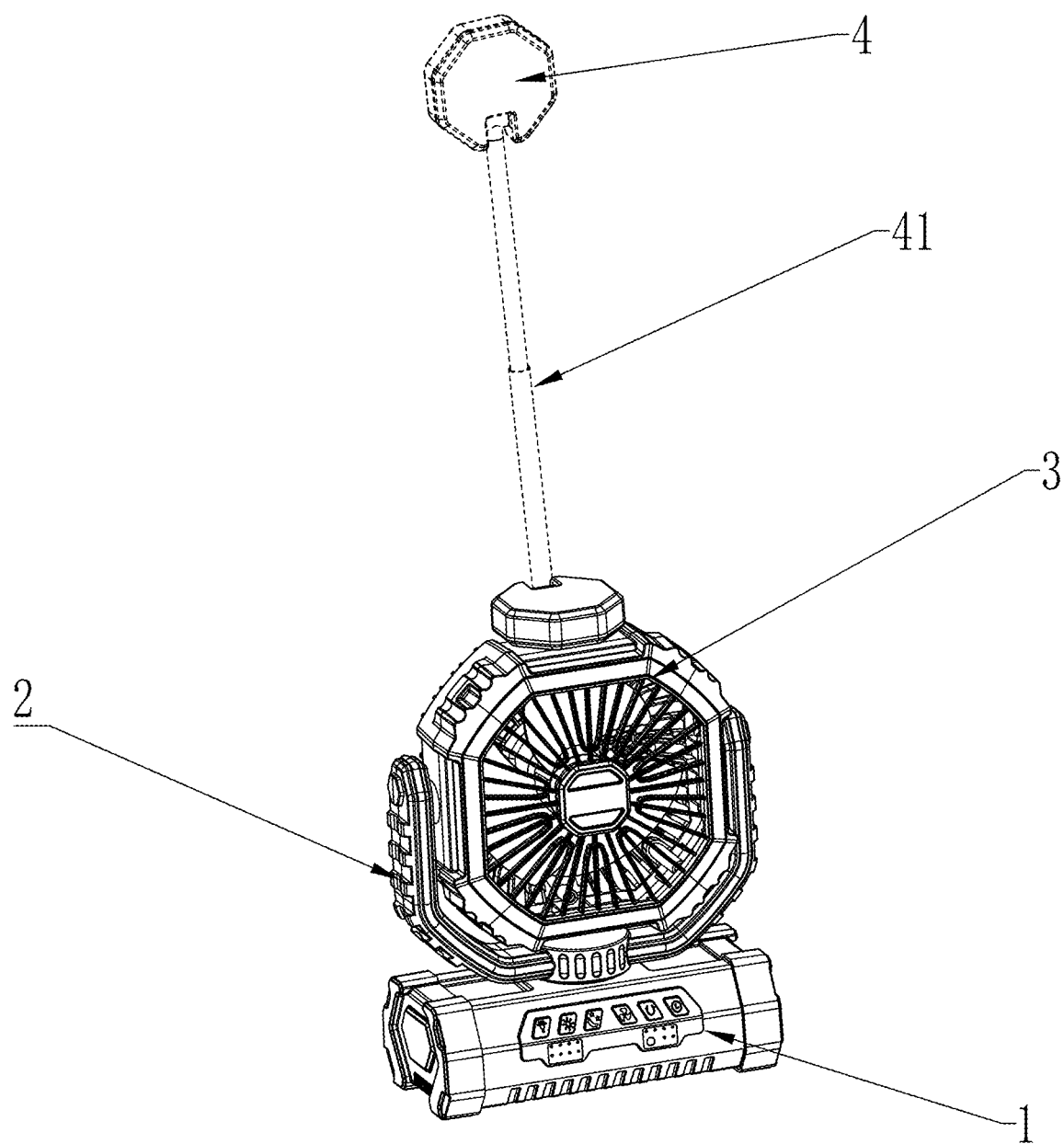
FIGS. 1 and 2 are overall schematic diagrams provided by an embodiment of the present disclosure.
Figure 2:
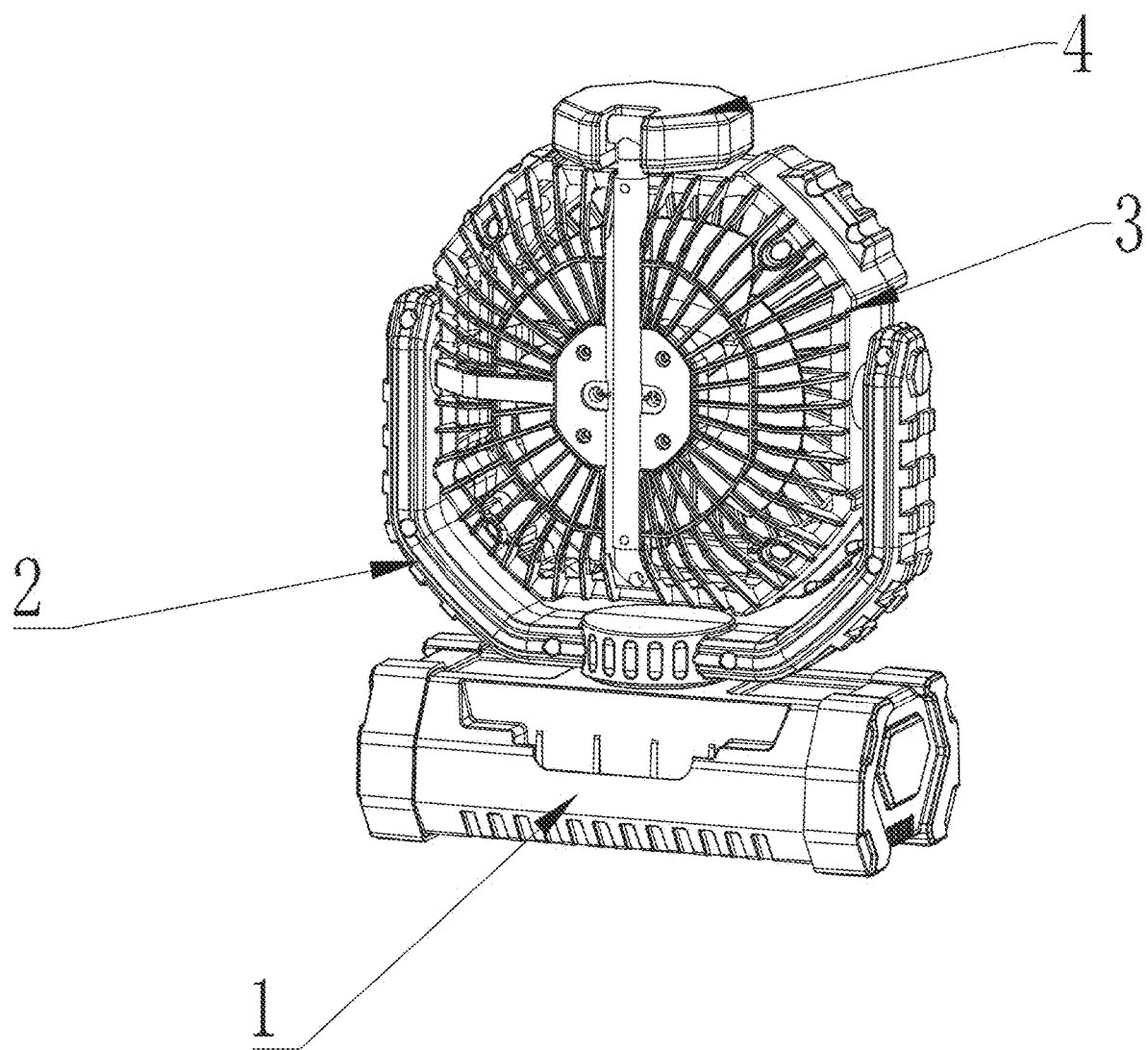
Figure 3:
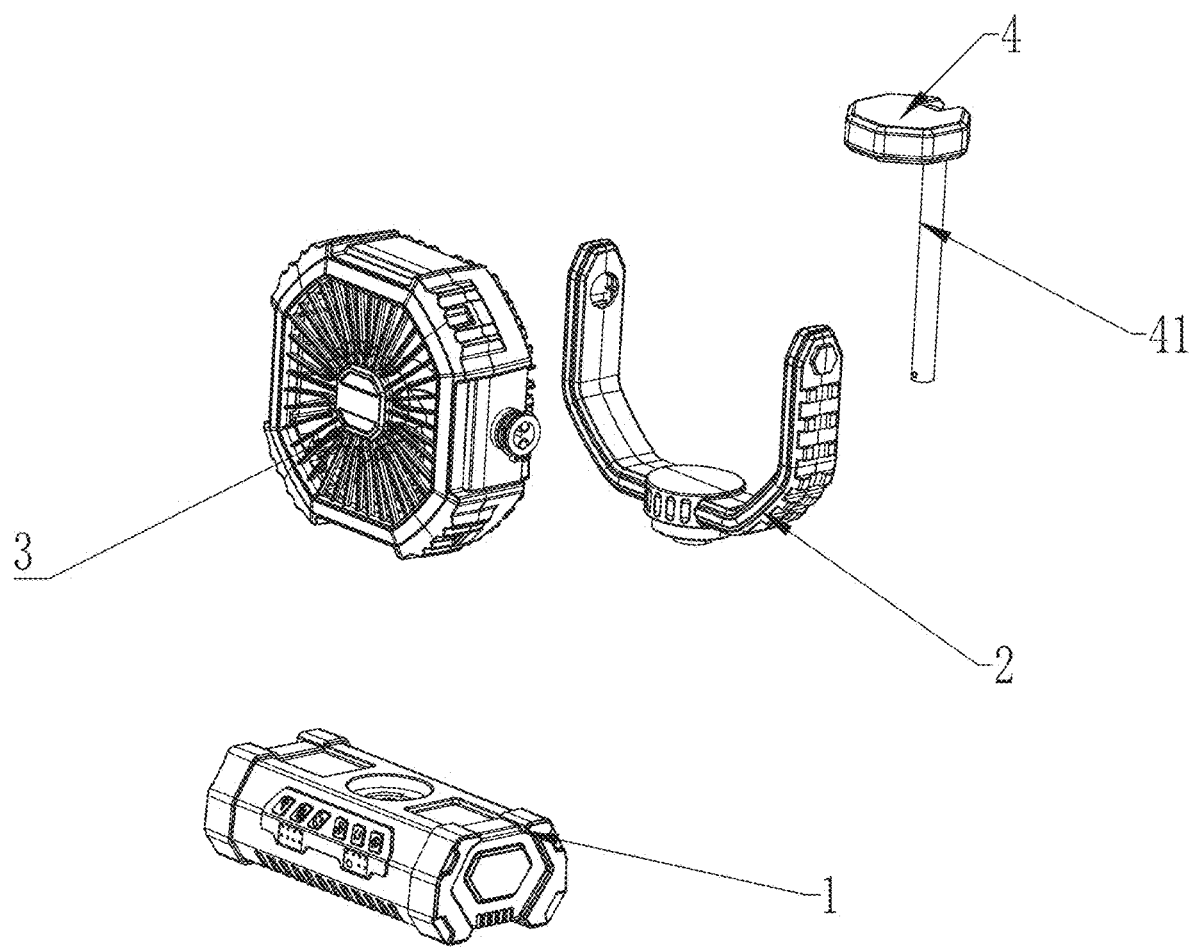
FIG. 3 is an explosion schematic diagram provided by an embodiment of the present disclosure.
Figure 8:
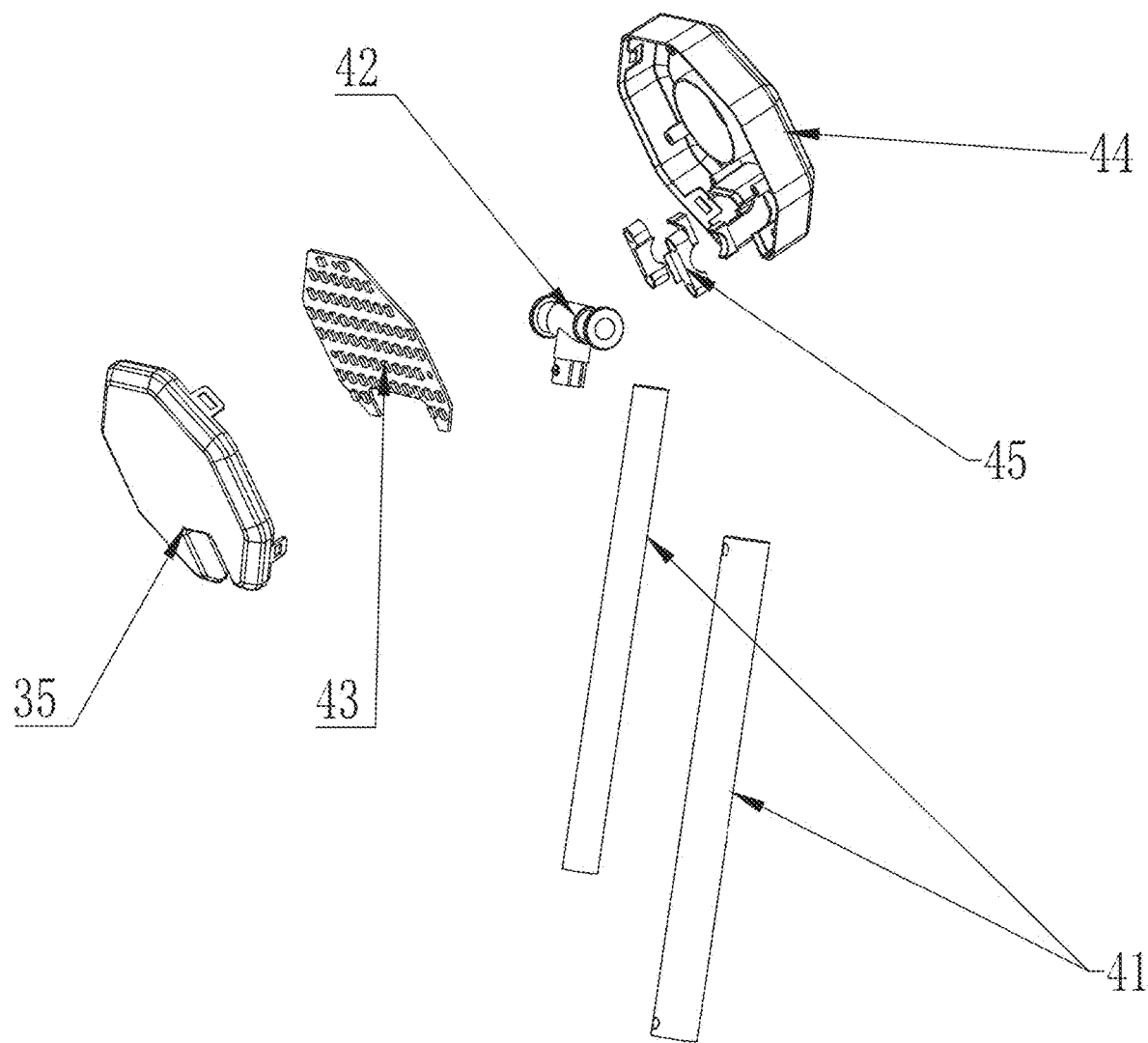
FIG. 8 is an explosion schematic diagram of a telescopic lamp provided by an embodiment of the present disclosure.

The telescopic lamp 4 is provided on a back of the fan 3 through a telescopic rod 41, as shown in FIGS. 1, 2, and 8. This design allows a height of the light to be freely adjusted, thereby enhancing the flexibility of use. The telescopic lamp 4 includes the telescopic rod 41, a T-shaped head 42, an LED light board 43, a cover plate 44, and the lampshade 35. The T-shaped head 42 is provided at a top of the telescopic rod 41, and the cover plate 44 is rotatably connected to the T-shaped head 42. The fixed component 45 installs the T-shaped head 42 on the cover plate 44, and the LED light board 43 is fixed on the cover plate 44 and protected by the lampshade 35, ensuring that the LED light board 43 can rotate freely in multiple angles, expanding the lighting range and meeting the lighting needs of different scenes.

As shown in FIG. 4, the base 1 is provided with a battery 12 and the PCB board 16. A surface of the base 1 is provided with a control button 161, and the PCB board 16 is electrically connected to the battery 12, the control button 161, the telescopic lamp 4, and a motor 32 of the fan 3. The surface of the base 1 is provided with an indicator light 162 that is electrically connected to the PCB board 16, thereby directly displaying a current working state, such as battery level, working mode, etc. Reinforced decorative covers 11 are provided on two sides of the base 1, which not only enhances the appearance beauty of the product, but also strengthens the structural strength. The PCB board 16 integrates a power management module, a driving circuit, and a control circuit. The power management module is responsible for the battery 12 charging, voltage regulation, and overcharge and over-discharge protection. The driving circuit is configured to control operations of the motor 32 and the light beads. The control circuit includes a microcontroller to process various input signals and perform corresponding actions.

In order to have a more thorough and comprehensive understanding of the disclosed content of the present disclosure, the principle will be further explained in combination with the usage method.

When the user first uses the device, he needs to ensure that the base 1 is firmly placed on a flat ground or hanging point. The bottom of the base 1 is provided with the foldable hook 14, as shown in FIGS. 1 and 9, which is connected to the base through the ratchet module 13. The user can choose to hang it flat or upside down according to his needs. If the user chooses the inverted suspension mode, simply unfold the hook 14 and fix it at a suitable suspension point such as a tree branch, tent stand, etc.

The user can activate or deactivate the electric swing function by the control button 161, allowing the fan 3 to automatically adjust direction and provide a more uniform air supply effect.

The mounting arm of the rotating base 2 is connected to two sides of the fan 3 through the ratchet module 13, as shown in FIGS. 5 and 6. When the user manually adjusts the angle of the fan 3, the spring plate 132 will generate slight resistance according to the teeth on the ratchet plate 131, ensuring that the position is locked after each adjustment. This design allows the user to easily adjust the fan 3 to a desired angle, thereby providing an ideal user experience whether blowing upwards or illuminating downwards.

The telescopic lamp 4 is provided on the back of the fan 3 through the telescopic rod 41, as shown in FIGS. 1, 2, and 8. The user can freely adjust the height of the light according to his actual needs, enhancing the flexibility of use. The cover plate 44 is rotatably connected to the T-shaped head 42, and the LED light board 43 is fixed on the cover plate 44 and protected by the lampshade 35, ensuring that the LED light board 43 can rotate freely in multiple angles and expand the illumination range. When camping at night, the user can pull out and adjust the telescopic lamp 4 to an appropriate height to illuminate the inside of the tent. When reading or doing handicrafts, the light can be adjusted to a lower position and focused on a specific area.

As shown in FIG. 7, the lamp strip 34 is electrically connected to the PCB board 16, and the user can turn on or turn off the lamp strip 34 by the control button 161 to select different brightness levels, thereby creating a warm and comfortable atmosphere. This design not only increases the functional diversity of the device, but also enhances the aesthetic appearance of the product, rendering it one of the highlights in outdoor activities.

When not in use, the telescopic lamp 4 can be retracted and the hook 14 can be folded so as to reduce space occupation and facilitate portability.

In summary, the camping the fan 3 and telescopic lamp 4 provided by the present disclosure not only overcome the limitations of existing products through a series of innovative designs and technological integrations, but also bring new user experience. It is a portable outdoor device that integrates the fan 3 and lighting functions, with high flexibility and stability, rendering it very suitable for the needs of modern outdoor enthusiasts.

After considering the specification and practicing the present disclosure, technical personnel in this field will easily come up with other embodiments of the present disclosure. This application is intended to cover any variations, uses, or adaptations of the present disclosure that follow the general principles of the present disclosure and include common knowledge or customary technical means in the art that are not disclosed in the present disclosure. The specification and embodiments are only considered exemplary, and the true scope and spirit of the disclosure are indicated by the claims above.

It should be noted that when a component is referred to as "fixed to" another component, it can be directly on the other component or there can also be a centered component. When a component is considered to be "connected" to another component, it can be directly connected to another component or there may be a central component present at the same time. On the contrary, when a component is referred to as "directly on" another component, there is no intermediate component. Terms "vertical", "horizontal", "left", "right" and similar expressions used in this specification are for illustrative purposes only and do not represent the only implementation method. Terms "upper", "lower", "left", "right", "front", "rear" and similar expressions used in this specification are based on the positional relationship of the reference figures.

It should be understood that the present disclosure is not limited to the precise structure described above and shown in the accompanying drawings, and various modifications and changes can be made without departing from its scope. The scope of the present disclosure is limited only by the appended claims.

What is claimed is:

1. A camping fan telescopic lamp, comprising a base, a rotating base, a fan, and a telescopic lamp;

wherein the rotating base is Y-shaped and rotatably provided on the base, two sides of the fan are rotatably provided on the rotating base;

the telescopic lamp is provided on a back of the fan through a telescopic rod; the base is provided with a battery and a printed circuit board, and a surface of the base is provided with a control button;

the printed circuit board is electrically connected to the battery, the control button, the telescopic lamp, and a motor of the fan.

2. The camping fan telescopic lamp according to claim 1, wherein a foldable hook is provided at a bottom of the base, and the hook is connected to the base through a ratchet module.

3. The camping fan telescopic lamp according to claim 1, wherein a fixed disk is provided at a center of a top of the base, and a swing motor is provided at a center of a bottom of the rotating base, an output shaft of the swing motor is clamped on the fixed disk, and the swing motor is electrically connected to the printed circuit board.

4. The camping fan telescopic lamp according to claim 1, wherein a mounting arm of the rotating base is connected to two sides of the fan through the ratchet module.

5. The camping fan telescopic lamp according to claim 2, wherein the ratchet module comprises a ratchet plate, a spring plate, and a rotating plate, the spring plate is fixed on the rotating plate and meshes with teeth of the ratchet plate;

the ratchet plate and the rotating plate are respectively fixed on rotating components, and the ratchet plate is a bidirectional indexing ratchet.

6. The camping fan telescopic lamp according to claim 1, wherein the fan comprises a cover, the motor, and fan blades, the cover wraps the motor and the fan blades, and the motor drives the fan blades to rotate.

7. The camping fan telescopic lamp according to claim 6, wherein a circular recess is provided at a front of the cover, and a lamp strip is provided in the recess;

a lampshade wraps and fixes the lamp strip in the recess, and the lamp strip is electrically connected to the printed circuit board.

8. The camping fan telescopic lamp according to claim 1, wherein the telescopic lamp comprises the telescopic rod, a T-shaped head, an LED light board, a cover plate, and the lampshade;

the T-shaped head is provided at an upper of the telescopic rod, the cover plate is rotatably connected to the T-shaped head, and the LED light board is fixed on the cover plate and wrapped by the lampshade.

9. The camping fan telescopic lamp according to claim 1, wherein a surface of the base is provided with an indicator light electrically connected to the printed circuit board, and reinforced decorative covers are provided on two sides of the base.

10. The camping fan telescopic lamp according to claim 1, wherein a power management module, a driving circuit, and a control circuit are integrated on the printed circuit board, and the power management module is configured for charging, voltage regulation, and providing overcharge and over-discharge protection for the battery;

the driving circuit is configured to control operations of the motor and light beads.

* * * * *